(No Model.)
W. W. BEAUMONT.
ELECTROMAGNETIC VARIABLE SPEED GEARING.
No. 519,031. Patented May 1, 1894.
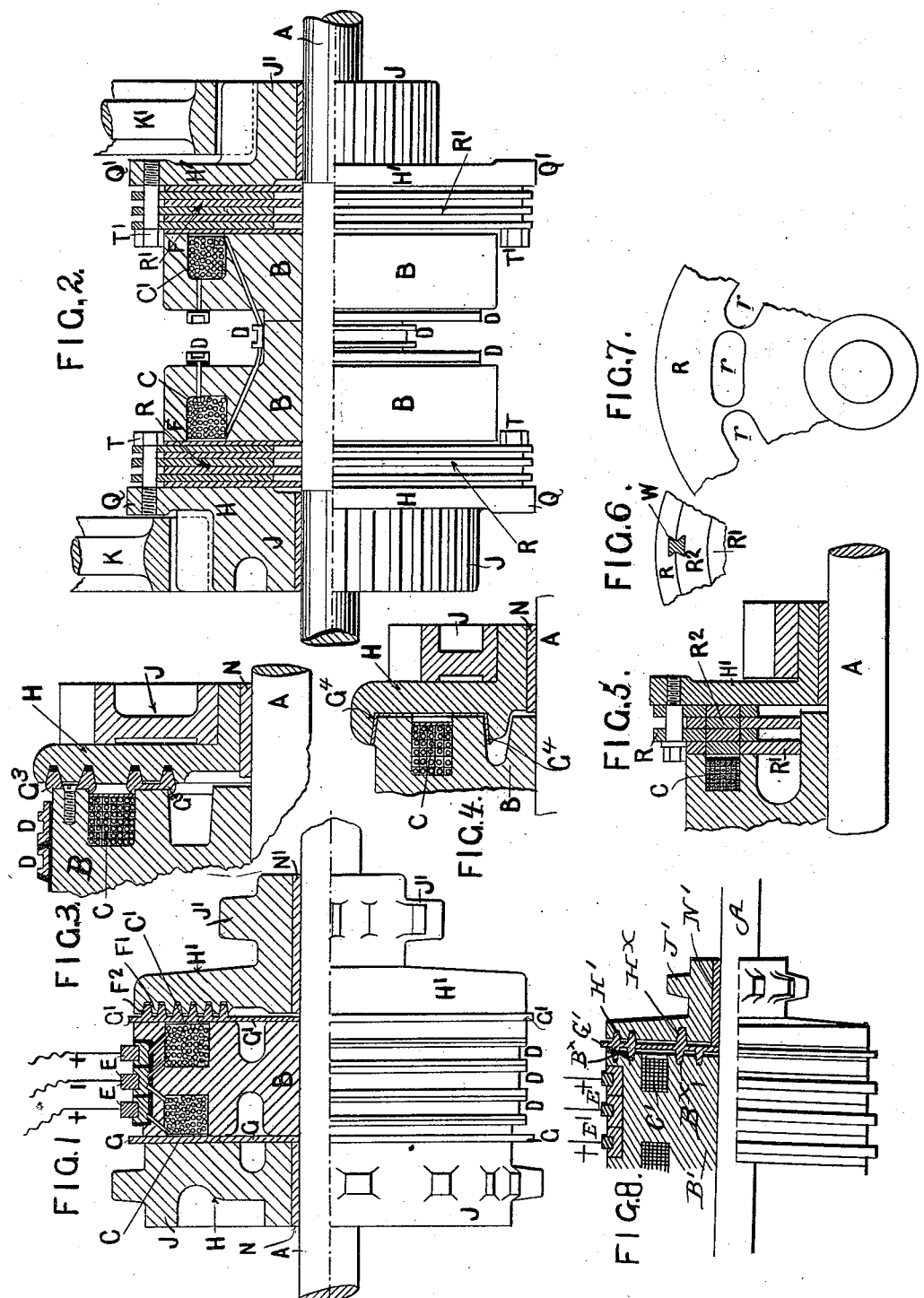
Witnesses:
H. G. Dieterich
M. G. E. Higgins
Inventor:
William W. Beaumont
By Henry O. M.
Atty.

UNITED STATES PATENT OFFICE.

WILLIAM WORBY BEAUMONT, OF LONDON, ENGLAND.

ELECTRO MAGNETIC VARIABLE-SPEED GEARING.

SPECIFICATION forming part of Letters Patent No. 519,031, dated May 1, 1894.

Application filed March 8, 1893. Serial No. 465,069. (No model.)

*To all whom it may concern:*

Be it known that I, WILLIAM WORBY BEAUMONT, a subject of the Queen of Great Britain, residing at 33 Norfolk Street, Strand, London, in the county of Middlesex, England, have invented a new and useful Electromagnetic Variable-Speed Gearing, of which the following is a specification.

My invention relates to the construction of gearing for imparting variable speed of rotation to machinery or to vehicles, while the gearing itself or part of it receives a nominally uniform speed of rotation.

Heretofore it has been proposed to construct electro-magnetic variable speed gearing comprising two disk electro-magnets (or a double faced disk electro magnet) fixed on a spindle, with corresponding disk armatures provided with transmitting wheels of different diameters loose on the spindle. These constructions have not proved successful owing to want of sufficient grip between armature and magnet, except by an excessive expenditure of current power. On the other hand the application of such excessive current power has proven injurious in that it results in a practically instantaneous overcoming of the inertia of the elements to be driven. Furthermore, in these magnetic clutches as heretofore constructed it is not possible by simply cutting off the current supply to instantaneously release the parts in magnetic engagement owing to the action of the remanent magnetism in the magnet and its armature.

Now my invention consists in an improved construction of electro-magnetic variable speed gearing, in which the said difficulties are removed by the interposition of friction devices between the poles of the electro-magnet and the surface of the armature. The use of friction devices between the magnet poles and the armatures is not only for the purpose of increasing the frictional surfaces of the parts and the consequent saving of power, but these friction devices also provide a means whereby the clutch can be gradually brought into action by a low current to start the movable parts of the clutch, which current can be gradually increased until the parts are in working engagement. This cannot be done with a clutch of this kind devoid of such friction devices, in that a low current power would have little or no effect in overcoming inertia, hence the frictional hold is either *nil* or very powerful. These friction devices serve, however, another very useful purpose in that they are rapidly demagnetized, so that the action of the remanent magnetism on the armature and magnet is effectually avoided, the frictional contact between the parts being interrupted with the interruption of the current supply. By this means the engine or motor in a station for generating the current employed for working tramways or railways or for working machines requiring great power for starting and comparatively small power when running, may be of much smaller power than has hitherto been possible, because by the use of the apparatus the maximum load upon the engine will be reduced and the load curve will be straightened.

In the accompanying drawings which illustrate some of the forms which the mechanism may take in accordance with my invention—Figure 1 is a sectional elevation of an arrangement in which two sizes of wheel gear are placed on the armature outside one double magnet and provided with interposed frictional devices. Fig. 2 is a sectional elevation showing in part an arrangement according to which the armature disks of the pinions or wheels are separated from the magnet by intervening frictional devices consisting of plates alternately connected to the pinion and to the shaft or spindle. Fig. 3 is a sectional part view of a modified form of magnet and armature, and Fig. 4 similarly of another modification. Fig. 5 is a similar view of another modification and Fig. 6 an end view of part of same. Fig. 7 is a part view of a friction plate. Fig. 8 is a sectional detail view of a modification of devices shown in Fig. 1.

In all these illustrations the same letters indicate in all the forms shown the same or similar parts.

In Fig. 1 A is a shaft or spindle which receives rotary motion from a motor or source of power at a nominally uniform rate and transmits it to a shaft or spindle to which it is desired to communicate rotary movement at different speeds. On the spindle A is fixed the disk B which is grooved on both faces for carrying coils of insulated wire C, C', the disk B thus constituting a double electro magnet. On the same spindle A and outside the electro magnet B are placed tooth wheels J J' which may be either for chain transmission or ordinary spur gear, gearing into wheels K K' on the shaft A Fig. 2. The disks H H' form the armatures to the double magnet B, and they are separated from the faces of the magnet by an intervening disk G G' which may be of non-magnetic materials or may be of iron or steel. The disks G may be attached to the magnet B or spindle A. The pinions J J' are loose upon the shaft A and are fitted with liners or bushes N N, suitable means of lubrication, not shown, being provided. When it is necessary to drive the driven shaft at the lower limit of speed permitted by the ratios of the gearing adopted in any case, electric current is sent into the coil C' of the magnet next the small pinion J'. The armature H' is then magnetically held to the magnet disk and in proportion to the magnetic pull and the friction between H' G' and the electro magnet B power will be conveyed through the wheel J' to the driven shaft. The double magnet B is provided with two coils C C' supplied with current by means of contact pieces E E E bearing against collector rings D D D, the central ring acting as conductor alternately to or from either of the coils. The disk H' of the smaller pinion J' is shown as corrugated or provided with a number of V-shaped annular grooves and the disk G', which may be and preferably is attached to the face F' of the electro magnet B, is correspondingly formed, as shown at $F^2$. As shown in Fig. 8, annular grooves $B^x$ might also be made in the face of magnet B' and grooves $H^x$ in the disk H so that the correspondingly formed disk G' might fit thereinto, thus forming a double faced ridge and groove piece instead of the single faced groove and ridge faced disk G' shown in Fig. 1, with the same object, namely to produce a powerful frictional grip or hold between the magnet B and the disk H with a comparatively small magnetic flux or small consumption of electricity. In the arrangements shown the magnet or magnets B are fixed to the shaft or spindle A by suitable well known means such as keys, set screws, by making that part of the shaft square or by screwing the shaft at that part and the interior of the boss of the magnet. The arrangements necessary with regard to the coils C C' and the connection between them and the collector rings and brushes or contact pieces and the electric circuit wires are such as are commonly known to electrical engineers. The proportions and sizes of wires in the coils and other parts and in the form and quantity of metal in the magnets and armatures are such as must be determined in accordance with the requirements of each application in accordance with now well known electro magnetic and electro-mechanical knowledge and practice.

In Fig. 2 is shown a modification of my invention, according to which the faces of the magnet B and that of the armature disks H H' are separated by intervening plates R R' which are alternately connected to the disk H by projecting ears or lugs, the screws T T' and the bosses Q Q' and to the shaft A which at the part shown may be square in section. Thus some of the alternate plates are fixed to the shaft while the others are carried by the pinions J J' and disks H H'. Upon the current being sent into, say the coil C, the magnetic circuit is partly made up or provided by the plates R and armature disk H and the frictional hold is increased in proportion to the number of the surfaces of the plates, although magnetic resistance caused by the joints between the plates somewhat diminishes the magnetic efficiency. Generally these disks or plates would be made as will be described in reference to Fig. 5.

Fig. 3 shows a sectional view of the armature H, part of one magnet B and coil C, the annular poles of the magnet being faced with renewable frictional ring pieces $G^3$, $G^3$, there being no magnetic circuit except through the armature H, and the frictional grip is increased and may be made equal to any desired frictional grip by giving the ribs on the rings $G^3$ and the grooves in the armature H a suitable angle.

Fig. 4 shows a modification in which the frictional grip is partly obtained by the angular or coned form given to the recess in the armature H and to the outsides of the magnet poles, which are tapered, the intervening ring pieces $G^4$ being in one piece and either of non-magnetic or magnetic material; and if required for mechanical and magnetic reasons, it may be separated into two rings so that it does not bridge the poles, or it may be perforated as shown at r in Fig. 7.

Fig. 5 shows a modification of Fig. 2 in which the plates R of Fig. 2 are constituted of three parts forming compound plates the central parts $R^2$ being made of non-magnetic metal. The three plates or rings are connected by key pieces W as shown in the partial segment Fig. 6, or are braced together. These plates as thus formed constitute at the same time multiple friction plates and extensions of the magnet pole pieces, the magnetic circuit only being completed by the armature H. The boss of the magnet is extended to take the plates as shown at R' Fig. 5, and carry them around with it, feathers being inserted for this purpose. Instead of making these plates of non-magnetic metal at the part where they bridge the poles, they may be made of iron or steel and in one piece, and may be perforated with large holes, leaving spokes connecting with the central and outer portions, as shown at r Fig. 7, these spokes affording only very small magnetic path, the circuit being made complete mainly by the armature H.

I do not desire to claim broadly the use of electro-magnets which with their armatures are known as magnetic clutches, couplings, or brakes, and acting as such, but What I do claim as my invention, and desire to secure by Letters Patent, is—

1. Variable speed transmitting gearing comprising a revoluble shaft, a multi-polar magnet fast thereon, transmitting wheels of different diameters loose on said shaft, an armature rigidly connected with each of the wheels each armature facing a pair of poles of the magnet, a friction device of suitable material interposed between the armatures and their magnet poles, and suitable electrical connections for energizing the magnet coils independently of each other, for the purpose set forth.

2. Variable speed transmitting gearing comprising a revoluble shaft, a multi-polar magnet fast thereon, transmitting wheels of different diameters loose on said shaft each facing a pair of poles of the magnet and forming armature therefor, a friction device of suitable material interposed between the armatures and their magnet poles, and suitable electrical connections for energizing the magnet coils independently of each other, for the purpose set forth.

3. Variable speed transmitting gearing comprising a revoluble spindle, transmitting wheels of different diameters loose on said spindle, a bi-polar double faced discoidal magnet fast on the spindle, armatures each carrying one of said transmitting wheels and having their acting surface opposite one of the faces or pairs of poles of the electro-magnet, friction rings interposed between the armature and the magnet provided with annular ribs on their opposite faces adapted to fit corresponding grooves in the proximate faces of the armatures and magnets, and suitable connections between the latter and a source of electricity for transmitting power to one or the other transmitting wheel, substantially as and for the purpose set forth.

WILLIAM WORBY BEAUMONT.

Witnesses:
DAVID McGAW,
    77 *Chancery Lane, London.*
THOMAS LAKE,
    17 *Gracechurch Street, London.*